United States Patent [19]
Dennis et al.

[11] 3,921,271
[45] Nov. 25, 1975

[54] AIR-COOLED TURBINE BLADE AND METHOD OF MAKING SAME

[75] Inventors: Ronald E. Dennis, Cincinnati; William D. Treece, Forest Park, both of Ohio

[73] Assignee: General Electric Company, Cincinnati, Ohio

[22] Filed: Jan. 2, 1973

[21] Appl. No.: 320,522

[52] U.S. Cl. .................... 29/156.8 H; 416/97
[51] Int. Cl.² ................. B21K 3/04; B23P 15/02
[58] Field of Search ............... 416/92, 95–97; 415/115–116; 29/156.8 H, 407; 72/28, 54

[56] References Cited
UNITED STATES PATENTS

| | | | |
|---|---|---|---|
| 2,225,513 | 12/1940 | Summers | 29/407 |
| 2,787,049 | 4/1957 | Stalker | 29/156.8 |
| 2,985,953 | 5/1961 | Eccles | 29/156.8 H |
| 3,014,269 | 12/1961 | Graham et al. | 29/156.8 H |
| 3,014,270 | 12/1961 | Eccles | 29/156.8 H |
| 3,026,605 | 3/1962 | Turner | 29/156.8 H |
| 3,039,178 | 6/1962 | Kent et al. | 29/156.8 H |
| 3,045,328 | 7/1962 | Turner et al. | 29/156.8 H |
| 3,107,417 | 10/1963 | Jaquish, Jr. et al. | 29/407 |
| 3,628,880 | 12/1971 | Smuland et al. | 416/97 X |
| 3,700,348 | 10/1972 | Corsmeier et al. | 416/90 |
| 3,715,170 | 2/1973 | Savage et al. | 416/97 |

FOREIGN PATENTS OR APPLICATIONS 811,921   4/1959   United Kingdom ........... 29/156.8 H

*Primary Examiner*—C. W. Lanham
*Assistant Examiner*—Dan C. Crane
*Attorney, Agent, or Firm*—Dana F. Bigelow; Derek P. Lawrence

[57] ABSTRACT

An improved method of making an air-cooled turbine blade includes the steps of casting a root or dovetail portion and an airfoil section which includes a leading edge, a hollow body portion, and a trailing edge having a plurality of coolant holes formed therein to the minimum practical cast opening size. The blade is then positioned in a fixture which provides a sealed, pressurized chamber around the root portion thereof; and the trailing edge of the blade is deformed to decrease the size of the trailing edge holes. The deformation is limited to the wall cross ties between each pair of holes, and the deformation is stopped when a desired trailing edge coolant efflux is achieved. A blade is thus provided which has wall cross ties which are both thinner and wider than achievable with present state-of-the-art investment casting techniques. Apparatus for performing the trailing edge crimping is also disclosed.

8 Claims, 8 Drawing Figures

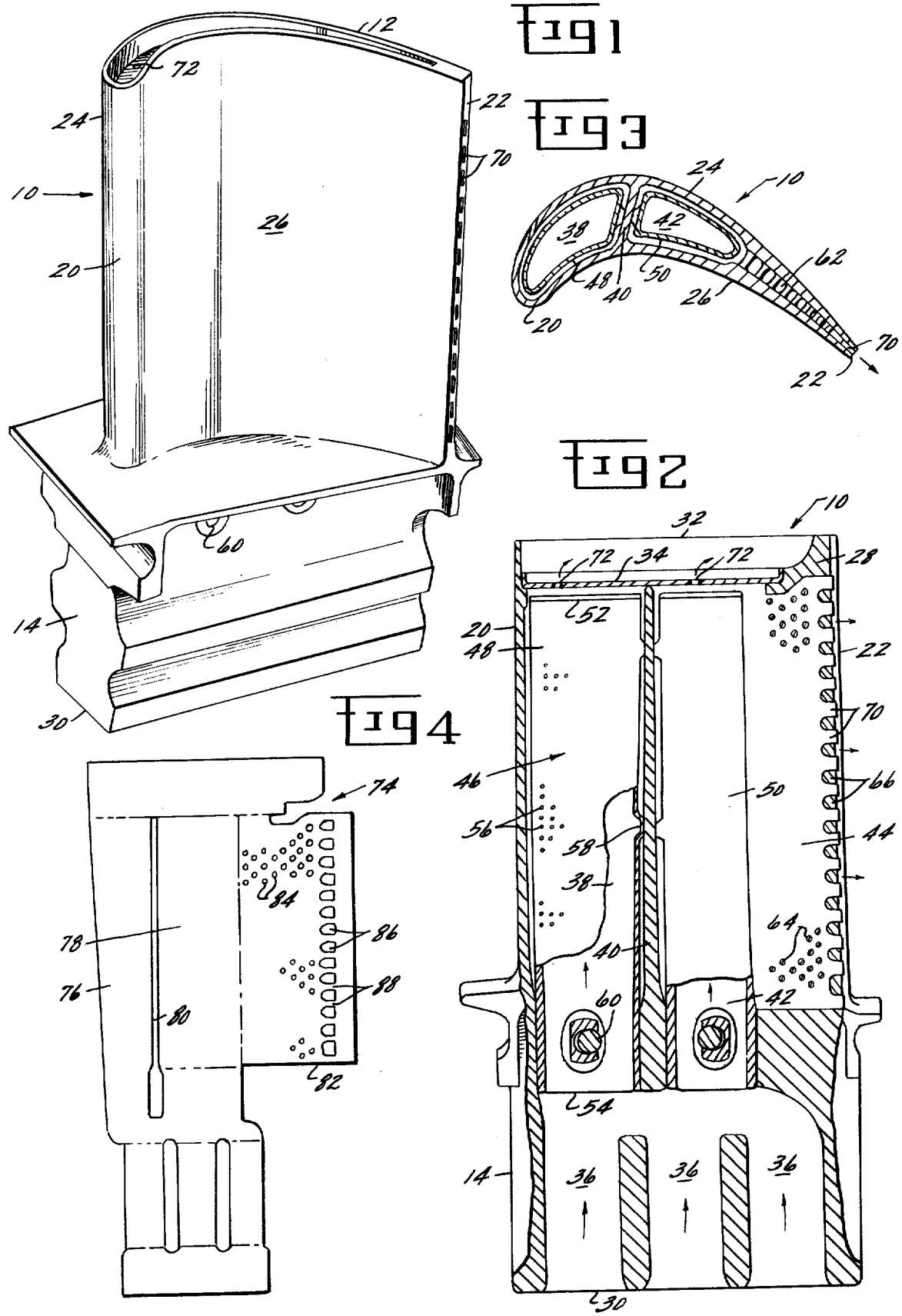

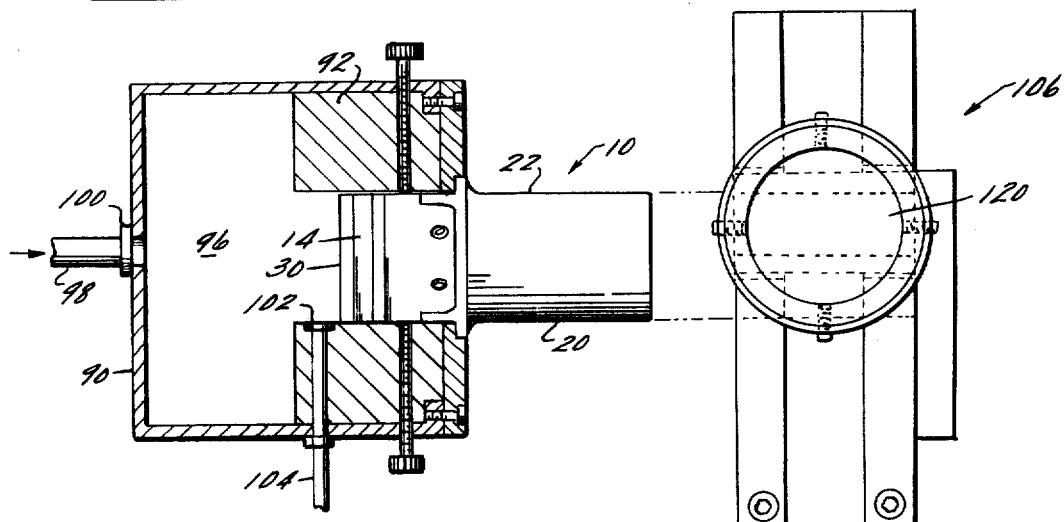
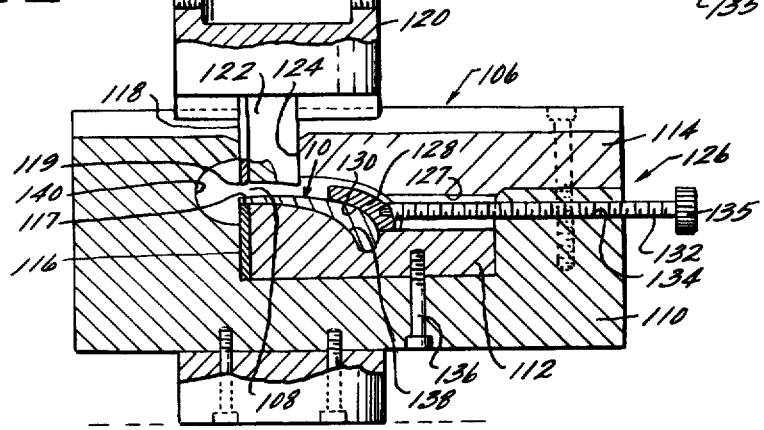
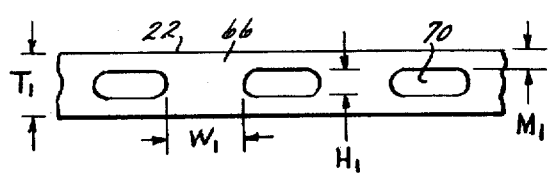
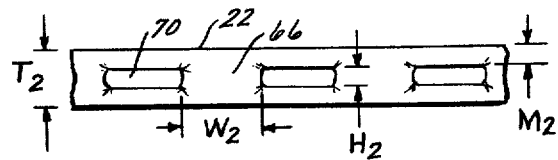

AIR-COOLED TURBINE BLADE AND METHOD OF MAKING SAME

The invention herein described was made in the course of or under a contract, or a subcontract thereunder, with the United States Department of the Air Force.

Background of the Invention

This invention relates generally to turbomachinery blading and, more particularly, to an improved air-cooled turbine blade having a plurality of trailing edge metering and flow distribution slots and also to a method of making such an improved blade.

Gas turbine engine manufacturers are constantly striving to improve the performance of their products, and one method of achieving this improved performance that has been utilized is to increase the maximum turbine operating temperature of the engine. As a result of these increases in turbine operating temperature, most, if not all, modern day gas turbine engines operate at turbine inlet temperatures which are significantly higher than the melting point of available blade materials. As a result of this, the high pressure turbine blades of modern aircraft gas turbines are cooled to lower temperatures to enable them to perform their functions for a required engine life. The most commonly used cooling media is air which is bled from the compressor and delivered to a turbine either internally of the engine through passageways formed by the turbine and compressor rotor shafts and discs, or through piping mounted externally of the engine.

As is well known in the gas turbine field, the amount of cooling air bled from the compressor must be minimized in order to maximize engine performance. Each percent of air which is bled from the compressor causes significant degradation in engine performance, and the total amount of cooling air must therefore be carefully metered and distributed. One commonly used practice in metering the cooling air flow is to provide blading having a plurality of small, closely controlled cooling holes through which the coolant flow must pass. These cooling holes are designed to meter the total amount of coolant which will pass through each individual turbine blade, and, as is well known in the art, may be located at various positions on the blade.

One common location for these metering holes is in the trailing edge portion of the blade. With such a design, cooling air may be supplied to internal cavities of the blade through holes in the dovetail portion thereof. This cooling air is utilized to cool the leading edge portion and the concave and convex body portions of the blade by means of convective or impingement cooling and is thereafter exhausted through the metering holes in the trailing edge portion of the blade directly into the primary airstream of the engine. In flowing through the metering holes, the coolant also convectively cools the trailing edge portion of the blade.

As seen from the above, the blade trailing edge area thus becomes of paramount importance to the metering and distribution of blade cooling air. The size and shape of the cooling holes must be closely controlled, and the holes must be properly located in order to cool the entire trailing edge. In the past, the traditional solution to the trailing edge metering and flow distribution problem has been to include a plurality of very small holes along the entire length of the trailing edge of the blade. The problem is further complicated when one considers that, from an aerodynamic standpoint, it is desirable that the trailing edge be an extremely thin member.

One can readily see from a brief review of the above statements that modern-day high pressure turbine blades have become extremely complex and difficult to manufacture. Fortunately, precision casting techniques have been developed to the stage wherein a turbine blade airfoil and dovetail section can be readily cast using the relatively old "lost wax" technique. When such an investment casting is used for the turbine blade, it is desirable to use a ceramic or glass core to provide the internal cooling cavities and the trailing cooling holes. To economically use a core opening to form the trailing edge holes, however, that opening must be wide enough to allow the ceramic core to be produced with enough strength to withstand the loading imposed upon it during the molding and casting process. It is also necessary to maintain a practical minimum wall thickness on each side of the trailing edge holes while maintaining the trailing edge as a desirable thin cross section. When one attempts to combine these requirements, it becomes readily apparent that the practical thicknesses achievable in today's state-of-the-art precision investment castings are greater than desired. If one uses a practical core opening size, the trailing edge thickness becomes greater than desired and thereby reduces aerodynamic efficiency; whereas, if one attempts to make the ceramic core opening of a smaller size, the cost and complexity involved in making such a core becomes prohibitive.

Because of these problems, the traditional approach has been to cast the trailing edge portion of the blade as a solid member with no core openings and to thereafter drill, by one of several techniques such as lasers or electrochemical machining, the number and size of holes required to meet the design exit area. When attempts are made to apply these drilling techniques to production hardware, the blade manufacturing becomes a very costly operation in terms of time required and scrap produced. In addition, the airflow metering obtained using this method is difficult to maintain since a practical tolerance on the drilled hole size can result in a large variation in trailing edge airflow.

Summary of the Invention

It is an object of this invention, therefore, to provide an improved air-cooled turbine blade with trailing edge coolant holes which are capable of accurately metering coolant flow through the trailing edge, and which are producible while maintaining practical wall thicknesses around the coolant holes and a minimum-thickness trailing edge. It is a further object of this invention to provide an improved method of making such a blade, which method utilizes precision casting techniques and does not require subsequent drilling of the trailing edge holes.

Briefly stated, the above and similarly related objects are attained in the present instance by providing a turbine blade which is cast with one or more internal cooling cavities and a plurality of trailing edge slots which are cast to the minimum practical thickness using the minimum wall metal thickness achievable considering all tolerances. The trailing edge is then locally deformed until the desired trailing edge thickness is achieved, with the plastic deformation being limited to the wall cross ties such that the metal wall thickness around the openings is not materially affected. The deformation limits are set by airflow exiting through the slot openings, with the airflow being measured as the trailing edge is being deformed and the deformation being stopped at a desired airflow level. If desired, the deformation can be limited to a certain portion of the overall height of the trailing edge or the deformation could be non-uniformly applied to provide a tapered trailing edge. Similarly, the cast trailing edge slots may be made of different initial sizes such that the deformed trailing edge would provide for different degrees of cooling efflux at different locations along the trailing edge.

DESCRIPTION OF THE DRAWINGS

While the specification concludes with a series of claims which particularly point out and distinctly claim the subject matter which Applicants regard as their invention, a complete understanding of the invention will be attained from the following detailed description, which is given in connection with the accompanying drawings, in which:

FIG. 1 is a perspective view of turbine rotor blade employing the improved fluid-cooled airfoil of this invention;

FIG. 2 is a side elevational view, drawn in partial section and to an enlarged scale, of the turbine blade of FIG. 1;

FIG. 3 is an enlarged, cross-sectional view taken along lines 3—3 of FIG. 2;

FIG. 4 is a side elevational view of a typical core utilized in the manufacture of the blade of FIG. 1;

FIG. 5 is a side elevational view, drawn in partial section, of a fixture suitable for carrying out the inventive method described herein;

FIG. 6 is a side elevational view, drawn in partial section, of the fixture employed in the inventive method described herein with the blade in position for crimping;

FIG. 7 is a partial, side elevational view of a portion of the trailing edge of the turbine blade of FIG. 1 prior to deformation; and FIG. 8 is a side elevational view, similar to FIG. 7, showing the trailing edge after deformation.

DESCRIPTION OF A PREFERRED EMBODIMENT

Referring now to the drawings wherein like numerals correspond to like elements throughout, reference is initially made to FIG. 1 wherein an improved airfoil of this invention has been shown in the form of a turbine blade at 10 as comprising an airfoil portion 12 and an attachment or root portion 14 adapted to secure the blade to a turbine rotor (not shown) in a well-known manner with the airfoil portion 12 extending generally radially across a motive fluid flow passage. The airfoil portion 12 includes a leading edge 20 and a chordwise spaced trailing edge 22 which are interconnected by convex and concave side wall portions 24 and 26, respectively. The airfoil portion 12 is suitably shaped in a well-known manner so as to efficiently extract energy from the motive fluid as it flows spanwise of the blade and impart rotary motion to the rotor.

As best shown in FIG. 2, the blade structure of this invention is preferably formed as a hollow, cast member 28 having an open inner end 30 and an outer or distal end 32. The outer end 32 is closed by a tip cap 34 which may be cast integrally with the member 28 or suitably secured thereto as by welding or brazing.

The root or attachment portion 14 is provided with means preferably taking the form of plenums or receiving chambers 36, for receiving a flow of suitable cooling fluid through the open inner end 30. A leading edge chamber 38 extends longitudinally of the airfoil portion 12 and is cooperatively formed by the cast member 28, including a central rib portion 40, and the tip cap 34. Similarly, a midspan chamber 42 extends longitudinally of the airfoil portion 12 and is cooperatively formed by the rib portion 40 of the cast member 28, a trailing edge portion 44 of the cast member 28 and the tip cap 34. In order to provide efficient cooling for the leading edge 20 and the convex and concave side wall portions 24 and 26, means designated generally at 46 are provided in flow communication with the cooling fluid of the chamber 36, for impinging the cooling fluid against certain portions of the inner walls of the cast member 28 as a plurality of high velocity jets. The impingement means 46 preferably comprise a pair of thin-walled, tubular inserts 48 and 50 which project into the chambers 38 and 42, respectively, with their walls lying in close-spaced relationship to the chamber walls.

The impingement inserts 48 and 50 are similarly constructed and, in order to avoid repetition, only the insert 48 will be described in detail. The insert 48 is provided with a closed outer or distal end 52 and an open inner end 54 in flow communication with the cooling fluid receiving chambers 36. The insert 48 is formed with a plurality of small openings or perforations 56 through which the cooling fluid is expanded and impinged against the chamber wall as a plurality of high velocity fluid jets. The insert 48 is located within the chamber 38 in any suitable manner, such as by knobs 58, and is held in this position by means such as a pin 60.

While the coolant receiving means has been shown as comprising separate receiving chambers 36 and separate distribution chambers 38 and 42, it will be recognized that a single chamber may be used in each location.

To provide cooling to the trailing edge region 44 of the blade, the radially extending chamber 42 is designed to lie in fluid flow communication with a trailing edge chamber 62 formed within the cast member 28 as shown in FIG. 3. Coolant flows through the perforations 56 associated with the impingement baffle 50 and then flows through the trailing edge chamber 62. A plurality of pin fins 64, formed integrally with and extending between side wall portions 24 and 26, may be provided to enhance the convective heat transfer in the trailing edge region 44 of the blade. To provide further cooling to the trailing edge region of the blade, as well as to provide means for effluxing the coolant from the chamber 42 so as to ensure a continuous flow therethrough, the trailing edge is formed with a plurality of solid, radially aligned rib members or wall cross ties 66 which, in turn, provide a plurality of trailing edge passages 70 through the trailing edge 22.

As further shown in FIG. 2, a small portion of the coolant exits the chamber 42 through an opening 72 formed in the tip cap 34. The majority of the coolant, however, exits through the passages 70 formed in the trailing edge 22 of the blade. As previously mentioned, since the use of compressor pressurized air represents a charge against or is of itself subtractive of engine efficiency, it is important that the amount of coolant which is utilized be closely metered. Since the coolant entering the chamber 42 is discharged through the trailing edge passages 70 directly in the gas stream, the amount of cooling air utilized by the blade is in most part determined by the size of the passageway 70. For this reason the size of these passageways must be accurately controlled.

Referring now to FIG. 4, a typical glass or ceramic mold which could be utilized in casting the hollow cast member 28 is generally designated by the numeral 74. The mold 74 includes solid sections 76 and 78 which will provide the hollow chambers 38 and 42, respectively, in the hollow cast member 28. The portions 76 and 78 are separated by an opening 80 which forms the rib member 40. Similarly, the mold 74 includes a trailing edge portion 82 which forms the trailing edge region 44 of the blade. The trailing edge portion 82 includes a plurality of small openings 84 adapted to provide the pin fins 64. As further shown in FIG. 4, the mold 74 includes a plurality of radially aligned openings 86, which are separated by solid post members 88, and which are adapted to provide the wall cross ties 66 and, thus, the trailing edge passageways 70.

As is well known in the art, in casting the hollow cast member 28, the core 74 is accurately positioned within a suitable mold (not shown) and molten material is poured into the mold. The hollow portions of the core 74 are filled with the molten material and the material is then permitted to harden. The core 74 is then etched away by means of a suitable leaching solution thus providing a hollow cast member similar to the one shown in FIGS. 1 through 3.

As is apparent from the above description, the radially aligned openings 86 will be filled with molten material to form the cross ties 66 during the casting process, and the post members 88 will thus form the trailing edge passages 70 when the core 74 is etched away. Since the trailing edge passageways 70 act as metering holes, they must be accurately dimensioned. For this reason, the dimensions of the post members 88 are critical.

As also mentioned above, it is desirable to provide the blade 10 with a minimum thickness trailing edge 22 so as to minimize blockage and its resultant detrimental effects on aerodynamic efficiency. As is obvious from a review of either FIG. 3 or FIGS. 7 and 8, the trailing edge thickness (T) comprises the metal thickness (M) on each side of the passageway 70 and the thickness of the passageway itself. Thus, it is desirable to maintain the thickness of the passageway 70 at a minimum level.

Problems result, however, when one attempts to decrease the thickness of the passageways 70 because the thickness of the post members 88 of the core 74 must be decreased accordingly. To economically use the core 74, the thickness of the post members 88 must be sufficient to withstand the loading imposed on the core 74 during the molding and casting process. Similarly, the thickness of the post members 88 must be such that the core 74 is not overly susceptible to handling damage during the molding and casting process. Studies have shown that the minimum practical hole diameter, and thus the minimum practical thickness of the post members 88, which results in $H_1$ in FIG. 7, is on the order of 0.020 inches. Attempts to further reduce this dimension result in prohibitive costs in terms of initial core manufacturing costs and/or scrap costs associated with damaged cores. Typical requirements for trailing edge passageway thicknesses in modern-day high pressure turbine blades may be on the order of 0.008 inches, a dimension which is more than 50 percent smaller than the minimum practical thicknesses achievable with standard investment casting techniques.

The most common solution to these problems has been to cast the cast member 28 with a solid trailing edge and thereafter to drill a plurality of small holes in the trailing edge to provide passageways 70. These drilling steps, however, add significantly to the manufacturing costs because of the time required and the scrap rates involved. In addition, the drilling techniques do not permit the desired airflow metering tolerances to be maintained, since a practical tolerance on the drilled hole size can result in a large variation in trailing edge airflow. Thus, it is desirable to eliminate this drilling requirement.

Referring now to FIGS. 5 and 6, suitable fixtures for sizing the trailing edge passageways 70 in accordance with the present invention are shown. A blade holding and pressurizing fixture is designated generally by the numeral 90. The blade holding fixture 90 includes means for securing the root portion 14, which blade securing means may take one of many forms. For example, as shown in FIG. 5, the blade securing means may comprise one or more flexible jackets 92 which have an opening 94 located therein adapted to receive the root portion 14 of the blade. The jackets 92 are adapted to sealingly engage the platform and root portion of the blade while permitting air to flow through the chambers 36 located in the root portion of the blade. The jackets 92 are further adapted to provide a sealed chamber 96 within the blade retaining fixture 90, which chamber 96 lies in fluid flow communication with the chambers 36 of the blade.

The chamber 96 is supplied with a pressurized fluid, such as air, by means of piping 98 connected to the fixture 90 via a suitable fitting 100. A suitable pressure tap 102, or other suitable pressure level measuring device, is located within the fixture 90 in such a manner as to provide an accurate indication of the pressure level within the chamber 96. While the pressure tap 102 may be located at any position within the chamber 96, a preferred location is at or near the inner end 30 of the blade. For this reason, as shown in FIG. 5, the pressure tap 102 is located within the jacket 92. The pressure tap 102 is connected to a suitable measuring device (not shown) via the tubing 104.

As further shown in FIGS. 5 and 6, the blade securing fixture 90 is designed so as to permit insertion of the blade end into a trailing edge crimping fixture 106, which is adapted to accurately crimp the trailing edge to a desired configuration in a manner to be described. The crimping fixture 106 provides a suitably shaped opening 108, as shown in FIG. 6. The opening 108 is formed by means of separate fixture sectors 110, 112 and 114, with the sectors 112 and 114 being removable from the sector 110. The fixture 106 further includes a pair of replaceable crimping arms 116 and 118, having contoured edges 117 and 119, respectively. As shown, the arm 116 is located between the sector 110 and the sector 112. The arm 118 is connected in any suitable manner to a hydraulic ram head 120 which includes a leg portion 122 adapted to slide within an opening 124 provided between the sectors 110 and 114. The fixture 106 further includes a blade locating arm 126 which is threadably engaged by the sector 110 and fits within a groove 127 formed within the sector 114. The blade locating arm includes a distal end portion 128, which includes a contoured surface 130 adapted to engage the convex portion of a blade in the manner shown. The blade locating arm 126 further includes a threaded shaft 132, which lies within a threaded opening 134 formed in the sector 110, and a knob portion 135.

As further shown in FIG. 6, the sector 112 fits within the sector 110 and is secured thereto in any suitable manner, such as by bolts 136. The sector 112 provides a contoured surface 138, which is adapted to correspond to the leading edge contour of a blade when a blade is positioned within the opening 108. When a blade is thus positioned within the opening 108, the knob portion 135 of the blade locating arm 126 is rotated until the contoured surface 130 comes into contact with the convex side of the blade and accurately locates the trailing edge portion of the blade between the crimping arms 116 and 118. As is readily apparent from the above description, the fixture 106 can be adapted to accept different sized blades simply by removal of the sector 112 and replacement thereof with a sector having a different contoured surface 138.

When the blade is located within the opening 108 and is held in place by the blade locating arm 126, the trailing edge portion of the blade is positioned such that the trailing edge cooling slots 70 exhaust into an enlarged cavity portion of the opening 108, which portion is formed by a contoured surface 140 formed within the sector 110.

In performing the inventive method, a blade 10 is located within the blade holding fixture 90 and is sealed within the jacket 92 such that the pressurized chamber 96 is formed beneath the root portion of the blade 10. All of the blade cooling exit locations other than the trailing edge slots 70 are then temporarily sealed in any desired manner. The blade 10 is then positioned within the opening 108 with the leading edge portion 20 of the blade lying in contact with the contoured surface 138. The knob portion 135 of the blade locating arm 126 is then rotated until the contoured surface 130 engages the convex surface of the blade 10 and accurately positions the trailing edge 22 thereof between the crimping arms 116 and 118.

A suitable source of pressurized fluid is then delivered to the chamber 96 such that the fluid enters the interior of the blade 10 and flows through the trailing edge slot 70 into the enlarged portion of the opening 108 formed by the contoured surface 140. This enlarged opening is provided such that the trailing edge slots 70 are exhausting into a known ambient pressure. When a steady-state flow through the trailing edge slots 70 has been achieved, the pressure within the chamber 96 is measured by means of the pressure tap 102.

A force is then applied to the hydraulic ram head 120 in any suitable manner, such as by means of a hydraulic jack. This force causes the crimping arm 118 to come into contact with the trailing edge 22 of the blade such that the tapered ends 117 and 119 will engage the trailing edge and begin to crimp the metal surfaces thereof. The force exerted on the trailing edge will cause the trailing edge to go from the configuration shown in FIG. 7 to that shown in FIG. 8.

While this crimping action is taking place the pressure within the chamber 96 is accurately monitored, and when this pressure reaches a predetermined level the force on the hydraulic ram head 120 is removed. As is well known to those skilled in the art, the flow through an orifice can easily be determined when one knows the pressure drop across the orifice. Furthermore, the pressure at the inlet of the trailing edge slots 70 can easily be calculated when one knows the pressure at the inlet chambers 36 of the blade cooling flow path. Since the trailing edge slots 70 are exhausting to ambient air within the enlarged chamber in the opening 108, the flow through the trailing edge slots 70 can be accurately determined from the pressure level recorded within the chamber 96 by means of the pressure tap 102.

Knowing the desired total airflow through the trailing edge slots 70, a force is thus applied to the hydraulic ram head 120 until a pressure level is achieved within the chamber 96 which indicates that this desired airflow is being obtained. The force is then removed from the hydraulic ram head 120 and the pressure level within the chamber 96 is re-checked to determine whether the trailing edge portion 22 of the blade 10 has partially returned to its initial configuration due to the natural hysteresis of the material. If so, a force is once again applied to the head 120 and the pressure within the chamber 96 is again measured. This process is continued until a desired trailing edge airflow is achieved. The blade 10 is then removed from the opening 108, and the trailing edge portion of the blade is inspected to determine that none of the individual trailing edge slots 70 have been closed down to the point where coolant will not flow therethrough.

As should be readily apparent from the above description, Applicants' inventive method can be modified in numerous ways without departing from the broader aspects thereof. For example, if the trailing edge dimension is more critical than the cooling airflow, suitable stops can be designed into the fixture 106 such that an accurate trailing edge dimension ($T_2$) is achieved when a force is applied to the hydraulic ram head 120. For example, stops could be located on either the fixture sector 110 or the ram head 120 or both. Furthermore, stops could be designed into the crimping arms 116 and 118, if desired.

Similarly, if differing amounts of cooling airflow are desired from the trailing edge of the blade, this could readily be achieved using Applicants' inventive method in one of at least two ways. The crimping arms 116 and 118 could be designed to provide varying degrees of crimping along the radial height of the blade merely by contouring the ends 117 and 119 thereof. For example, if a tapered trailing edge, i.e. one having a greater thickness at the root portion than at the tip of the blade, were desired, the arms 116 and 118 could readily be adapted to provide this taper by simply tapering either or both of the ends 117 and 119 thereof such that the portion of the arms 116 and 118 which crimps the trailing edge near the tip of the blade engage the blade prior to engagement by the remaining portion of the arms. If more tapering is desired in the middle of the blade than at either end thereof, the arms 116 and 118 could be made longer in their midsections and thus provide the desired trailing edge configuration. In the alternative, if various degrees of coolant efflux are desired from the trailing edge, the initial size openings (W) and (W) of the trailing edge passageways could be varied when the hollow core member is initially cast. Thereafter, uniform crimping could be applied using Applicants' inventive method, and varying degrees of trailing edge coolant would be obtained.

Applicants' inventive method provides a number of basic advantages over all known prior art schemes. As previously described, Applicants' method permits a casting to be made which includes cast trailing edge cooling slots provided by a core having posts which are sufficiently large to reduce the costs thereof to a practical level and which are sufficiently large to reduce breakage associated with the casting process. Applicants' inventive method further eliminates the need for drilling trailing edge holes and for providing any other finishing steps on the trailing edge portion of the blade. Furthermore, a practical cast trailing edge opening is too large in both directions, mainly radial height and width. The crimping operation performed on the trailing edge as part of Applicants' inventive method reduces the trailing edge openings in both directions, with the amount of reduction being readily determined from the known Poisson's ratio of the material. Finally, the crimping operation can easily be controlled to provide extremely accurate cooling airflow through the trailing edge thus increasing the overall efficiency of the engine, and this crimping operation can be performed without deforming thef edge slots.

That is, changes in (H) and (W) of the solid wall cross ties, and thus of the trailing edge openings, are achieved as shown in FIGS. 7 and 8 without reducing the wall thickness (M) of the trailing edge.

The appended claims are intended to cover modifications similar to those described above which fall within the broader aspects of Applicants' invention.

What is claimed is:

1. In a method for making an air-cooled turbomachinery blade comprising the steps of:
   forming into a final shape an airfoil having at least one hollow internal cavity and having a trailing edge with a plurality of openings therein for the efflux of air from the internal cavity, and
   crimping only the trailing edge portion of the airfoil to a thickness at which a desired amount of air is flowing through said openings.

2. In the method of claim 1, the further steps of:
   supplying pressurized air to the internal cavity at the same time the deforming step is occurring,
   measuring the efflux through said openings, and
   stopping the deformation when the airflow reaches a predetermined level.

3. The method of claim 2 wherein the efflux is measured by providing a sealed cavity around a root portion of the blade in fluid flow communication with said internal cavity, and measuring the pressure in said selaed cavity.

4. The method recited in claim 3 comprising the additional step of:
   sealing all cooling exhaust passages associated with said blade other than the trailing edge openings.

5. The method recited in claim 4 comprising the additional step of:
   providing an enlarged cavity surrounding the trailing edge openings whereby said openings exhaust to a known ambient pressure.

6. The method recited in claim 2 including the further step of:
   inspecting individual trailing edge openings to determine that flow will occur through each opening.

7. In the method of claim 1 wherein said trailing edge comprises a first wall thickness and a second wall thickness separated by a plurality of wall cross ties, the additional step of:
   stopping the deformation at a point prior to the time when either said first or second wall thickness would start to deform.

8. The method recited in claim 1 including the further steps of:
   measuring the trailing edge thickness while deforming same, and
   stopping the deformation at a desired trailing edge thickness.

* * * * *